United States Patent [19]

Fox

[11] 4,022,241
[45] May 10, 1977

[54] DAMPER SEALING STRUCTURE
[75] Inventor: Edward L. Fox, Loveland, Ohio
[73] Assignee: Air Clean Damper Co., Inc., Cincinnati, Ohio
[22] Filed: Nov. 25, 1975
[21] Appl. No.: 635,216
[52] U.S. Cl. .............................. 137/240; 251/174; 251/328; 138/94.3
[51] Int. Cl.$^2$ ........................................ F16k 3/312
[58] Field of Search ............ 137/246.22, 240, 246; 251/174, 176; 138/94.3

[56] References Cited
UNITED STATES PATENTS

| | | | |
|---|---|---|---|
| 1,489,857 | 4/1924 | Stevens | 251/174 |
| 3,580,541 | 5/1971 | Bouitot | 251/174 |
| 3,658,084 | 4/1972 | Hastings et al. | 137/246.22 |
| 3,918,471 | 11/1975 | Bedner | 137/240 X |

Primary Examiner—Arnold Rosenthal
Attorney, Agent, or Firm—James W. Pearce; Roy F. Schaeperklaus

[57] ABSTRACT

A mount for a damper which is inserted between duct sections. An assembly of bent plate spring duct seal members forms a seal assembly mounted on each duct section at adjacent ends of the duct sections. The damper plate advances between the seal assemblies in sealing relation with the seal members. An enclosure surrounds the seal assemblies to form a chamber surrounding the seal assemblies. Air is blown into the chamber to prevent escape of contents of the duct sections at the damper plate. Access openings are provided in the enclosure. Adjoining edges of the spring seal members are bridged by angle-shaped bridge members.

2 Claims, 14 Drawing Figures

DAMPER SEALING STRUCTURE

This invention relates to a damper for an elongated hollow duct. More particularly, this invention relates to a plate-like damper which extends transversely of the duct and which is provided with pressurized seals.

An object of this invention is to provide such a damper which extends transversely of a duct of rectangular cross-section and in which the seals include spring metal sections which meet at corners of the duct and are provided with bridging members which minimize pressure loss at intersections of the seal sections while edge portions can flex as the damper moves.

A further object of this invention is to provide such a damper in which a sealing structure surrounds the damper at the duct, and means is provided for producing a greater pressure inside the sealing structure than inside duct sections so that any leakage which occurs is into the duct and not out of the duct.

Briefly, this invention provides a damper which extends crosswise of a duct of rectangular cross section. The duct is surrounded by a pressure chamber provided with bent plate spring metal sealing members which engage the damper to form a seal therewith. Edges of the sealing members are bridged by bridge strips which minimize loss of pressure at corners of the pressure chamber as outer portions of the sealing members flex as the damper is inserted into the pressure chamber into duct closing position.

The above and other objects and features of the invention will be apparent to those skilled in the art to which this invention pertains from the following detailed description and the drawings, in which.

In the following detailed description and the drawings, like reference characters indicate like parts.

Figure 1:
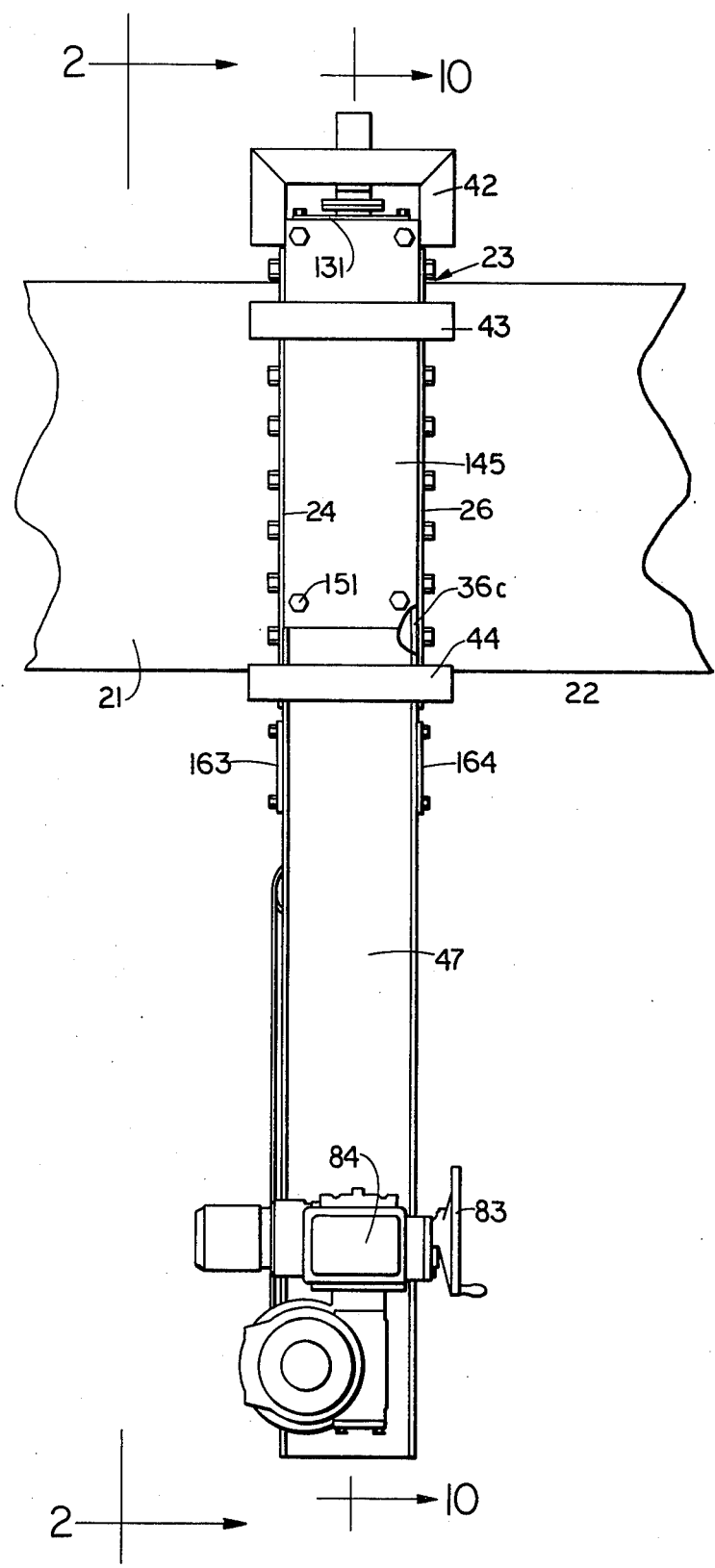
FIG. 1 is a view in side elevation showing fragmentary sections of an elongated duct with a damper and damper mounting assembly constructed in accordance with an embodiment of this invention being shown between duct sections.
Figure 2:
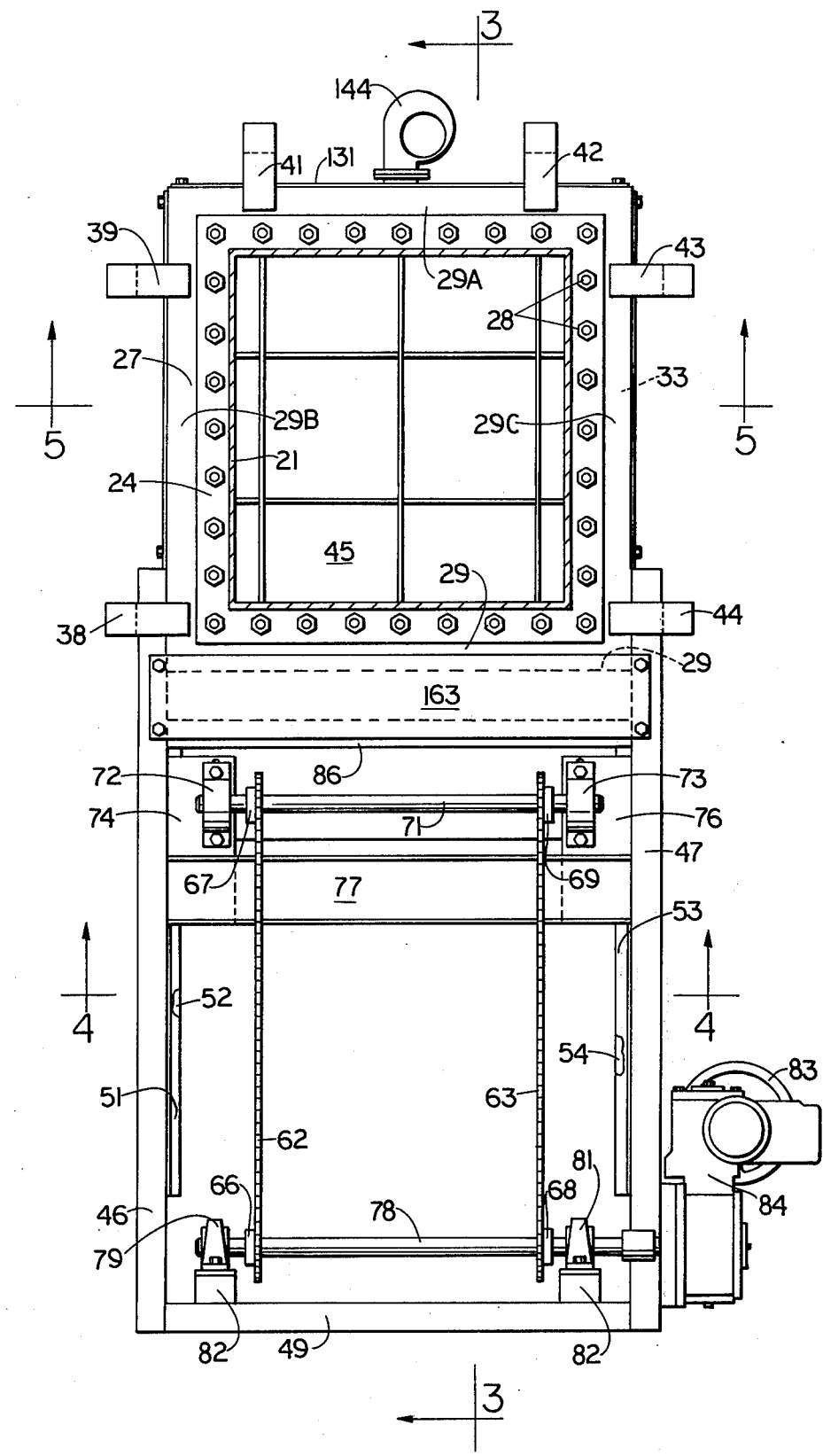
FIG. 2 is a view in section taken on the line 2—2 in FIG. 1.
Figure 5:
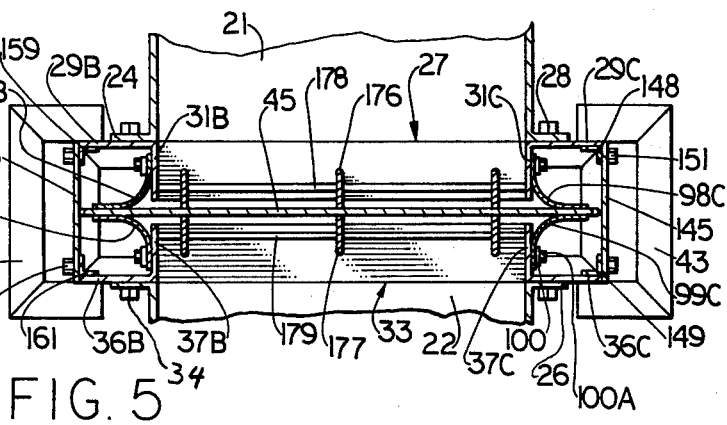
FIG. 5 is a view in section taken on the line 5—5 in FIG. 2.

In FIG. 1 are shown duct sections 21 and 22 which are connected by a damper mounting assembly 23 constructed in accordance with an embodiment of this invention. As shown in FIG. 2, the duct section 21 is of substantially rectangular cross section, and flanges 24 extend outwardly from an end portion thereof. The section 22 can be of similar shape in cross section and terminates in outwardly extending flanges 26 (FIG. 5). An annular member 27 of angle shape in section is attached to the flanges 24 of the duct section 21 by fasteners 28 with outwardly extending flanges 29 (FIG. 3) 29A, 29B (FIG. 5) and 29C thereof in flatwise relation with the flanges 24 and with inner flanges 31 (FIG. 3), 31A, 31B (FIG. 5) and 31C thereof extending in alignment with walls of the duct section 21. An annular member 33 of angle shape in section is attached to the flanges 26 of the duct section 22 by fasteners 34 with outwardly extending flanges 36 (FIG. 3), 36A, 36B (FIG. 5) and 36C thereof in flatwise relation with the flanges 26 and with inner flanges 37 (FIG. 3) 37A, 37B (FIG. 5) and 37C thereof extending in alignment with walls of the duct section 22. Channel shaped bridging members 38 (FIG. 2), 39, 41, 42, 43 and 44 link the outwardly extending flanges of the annular members 27 and 33 (FIG. 3) to hold the annular members 27 and 33 with edges of the aligned flanges thereof spaced sufficiently to permit passage of a flat damper plate 45 therebetween.

Figure 7:
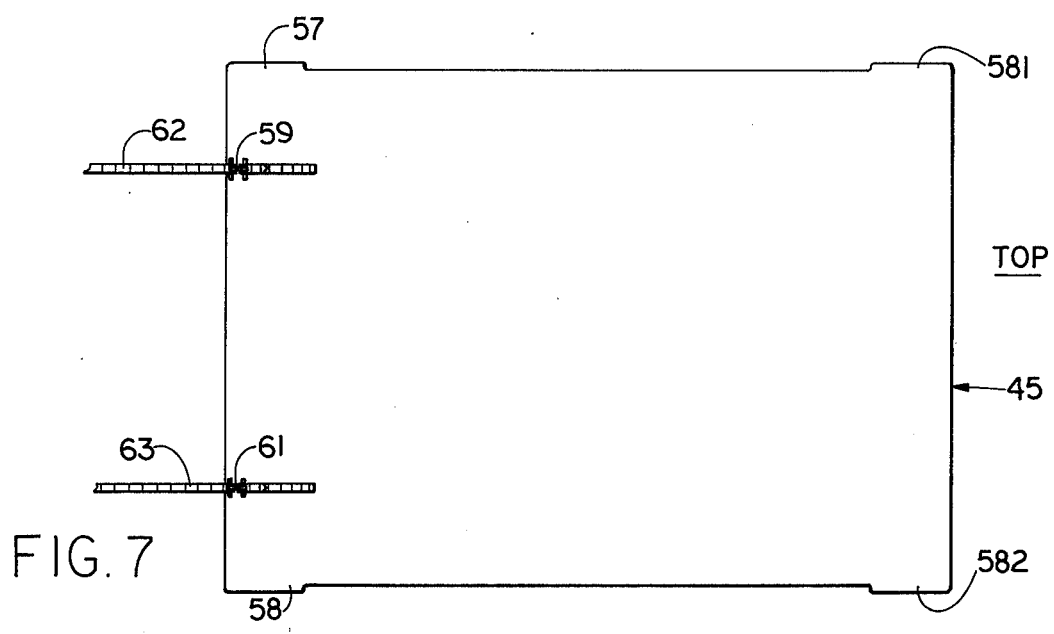
FIG. 7 is a view in end elevation of a damper member of the assembly shown in FIG. 1, a fragmentary portion of a chain drive therefor being shown in association therewith.
Figure 8:
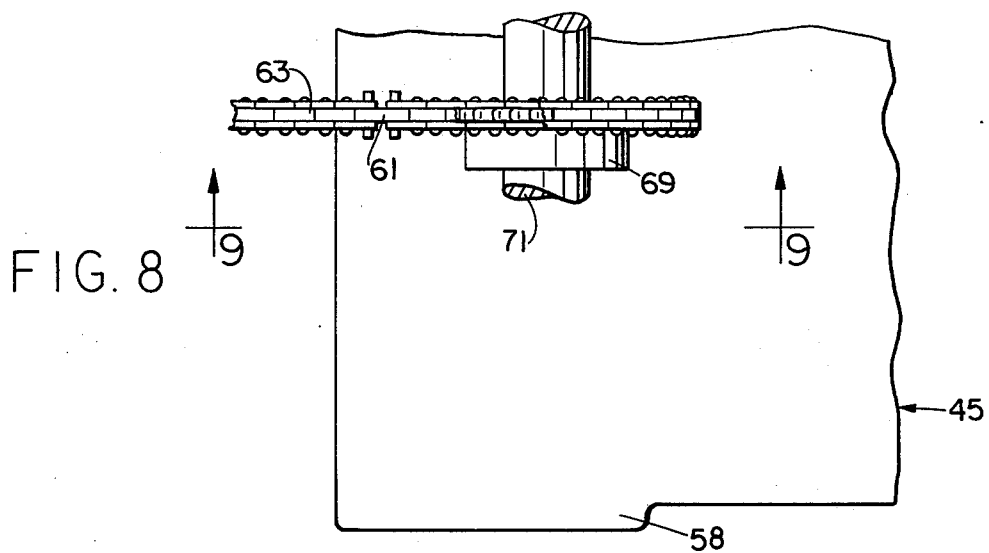
FIG. 8 is an enlarged fragmentary view of the damper and chain shown in FIG. 7, a portion of a drive shaft and a sprocket being shown in association therewith.
Figure 9:
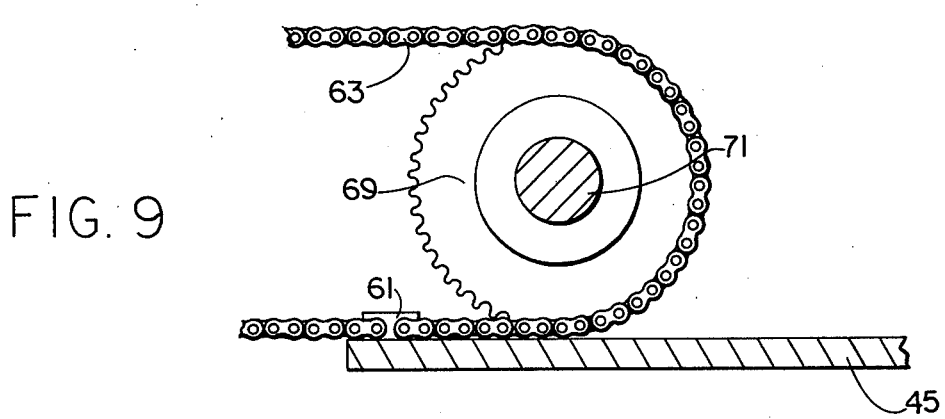
FIG. 9 is a view in section taken on the line 9—9 in FIG. 8.

The damper plate 45 is mounted for sliding between channel frames 46 and 47 (FIG. 2). Upper end portions of the channel frames 46 and 47 are attached to edges of the flanges 29B, 29C, 36B and 36C. Lower end portions of the channel frames 46 and 47 are connected by a cross channel frame 49. Pairs of angle shaped track members 51–52 (FIG. 3) mounted on the web of the channel frame 46 and track members 53–54 (FIG. 4) mounted on the web of the channel frame 47 guide sidewardly projecting portions 57 (FIG. 7) and 58 respectively which are on lower portions of upright edges of the damper plate 45. Sidewardly projecting portions 581 and 582 on upper portions of the upright edges guide the upper portion of the damper plate 45. Chain anchors 59 and 61 are mounted on the damper plate 45. Chains 62 and 63 are attached to the chain anchors 59 and 61, respectively, as shown in FIGS. 8 and 9. The chain 62 runs on sprockets 66 (FIG. 2) and 67. The chain 63 runs on sprockets 68 and 69. The sprockets 67 and 69 are mounted on an idle shaft 71, which is rotatably mounted in bearings 72 and 73. The bearings 72 and 73 are mounted on plates 74 and 76, respectively, which are supported on a cross frame 77, which spans the channel frames 46 and 47. The sprockets 66 and 68 are mounted on a shaft 78, which is rotatably mounted in bearings 79 and 81. The bearings 79 and 81 are mounted on supports 82 carried by the cross channel frame 49. The shaft 78 can be driven by a handle 83 which drives appropriate gearing in a gear box 84 mounted on the channel frame 47.

Figure 3:
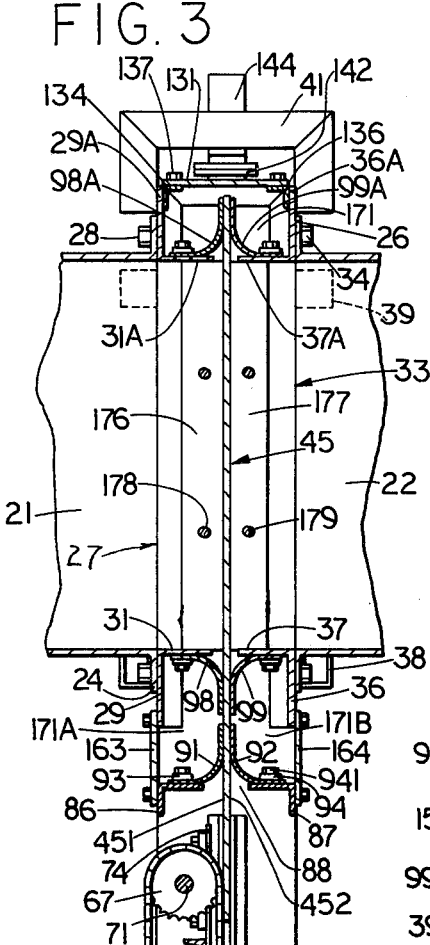
FIG. 3 is a view in section taken on the line 3—3 in FIG. 2.
Figure 4:
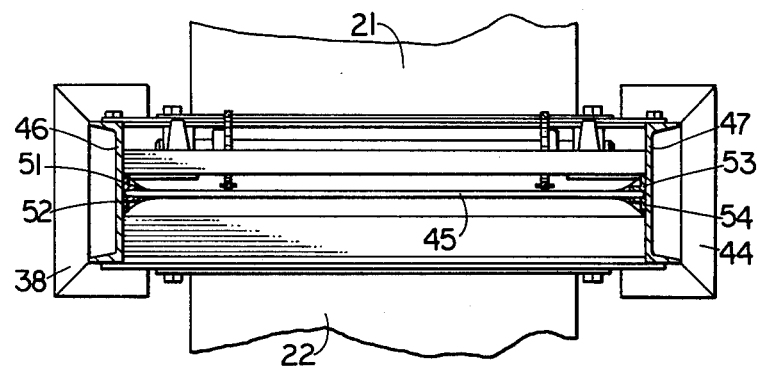
FIG. 4 is a view in section taken on the line 4—4 in FIG. 2.

The damper plate 45 can be moved from the closed position shown in FIG. 3, in which the damper plate 45 spans the duct sections 21 and 22 to isolate the duct sections from each other, to a retracted position (not shown) in which the damper plate 45 is below the duct sections 21 and 22 to permit flow from one of the duct sections into the other.

Figure 10:
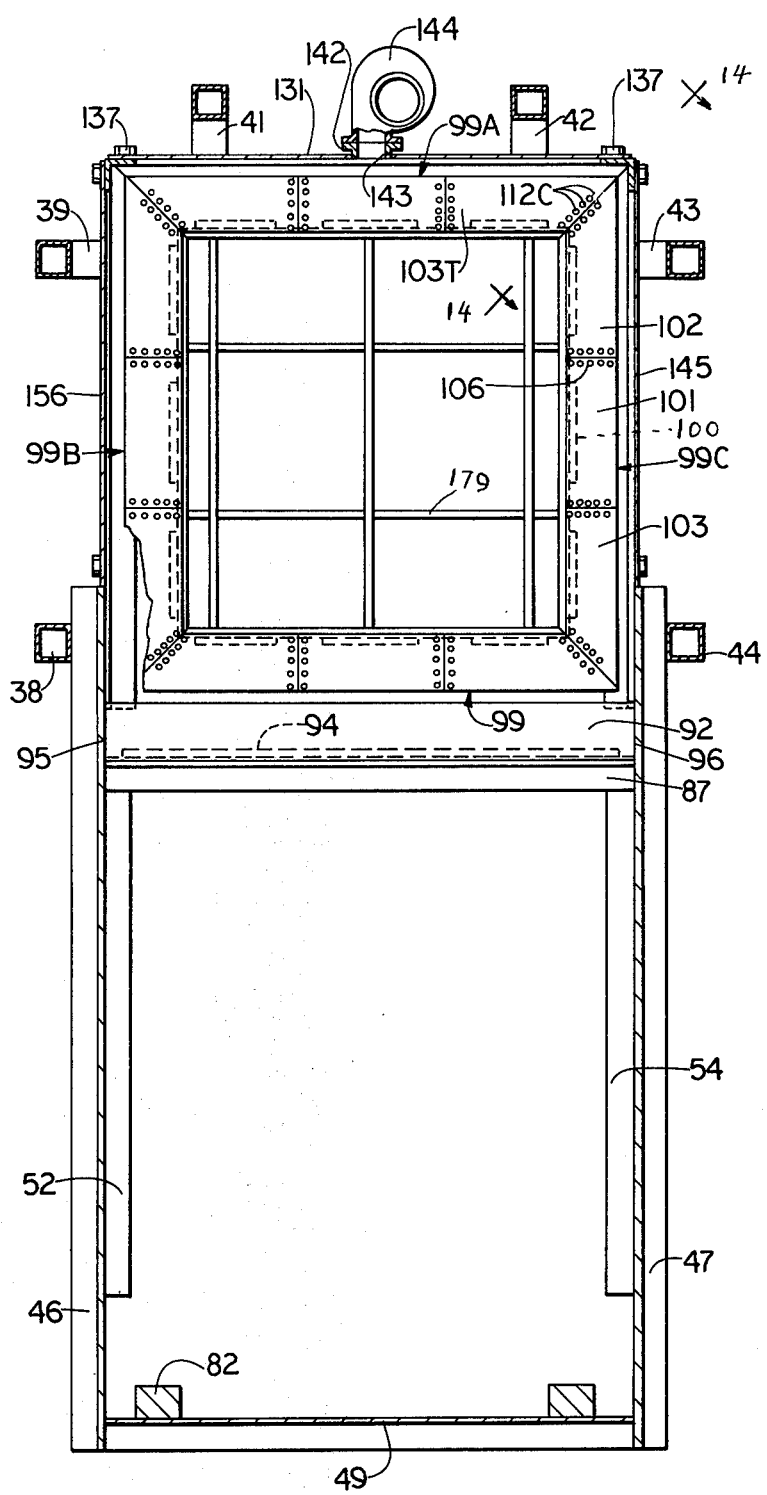
FIG. 10 is a view in section taken on the line 10—10 in FIG. 1, portions being broken away to reveal details of structure.

Angle shaped cross frames 86 and 87 (FIG. 3) are attached to and span the channel frames 46 and 47 (FIG. 2) adjacent to but spaced from the duct sections 21 and 22 (FIG. 3) with a space 88 being formed between the frames 86 and 87 through which the damper plate 45 projects. First lengthwise edge portions of bent plate spring metal seal members 91 and 92 are mounted on the cross frames 86 and 87, respectively, and opposite lengthwise edge portions of the seal members 91 and 92 engage faces 451 and 452, respectively, of the damper plate 45 in substantially air tight sealing relation therewith with the damper plate 45 being slidable therebetween. Metal bars 93 and 94 overlie the first edge portions of the spring seal members 91 and 92, and are attached to the cross frames 86 and 87, respectively, by fasteners 941 to hold the spring seal members 91 and 92 in position. As shown in FIG. 10, opposite end edges 95 and 96 of the spring metal seal member 92 are substantially in engagement with the channel frames 46 and 47, respectively. Opposite end edges (not shown) of the spring metal seal member 91 are similarly in substantial engagement with the channel frames 46 and 47.

Bent plate spring seal members 98 (FIG. 3), 98A, 98B (FIG. 5) and 98C are mounted on the flanges 31, 31A, 31B and 31C, respectively, in position for engagement of lengthwise edge portions thereof with the face 451 of the damper plate 45. Bent plate spring seal members 99 (FIG. 3), 99A, 99B (FIG. 5) and 99C are mounted on the flanges 37, 37A, 37B and 37C, respectively, and are in position to engage the face 452 of the damper plate 45. Metal bars 100 overlie lengthwise edge portions of the spring seal members and are attached to respective flanges by fasteners 100A.

Figure 6:
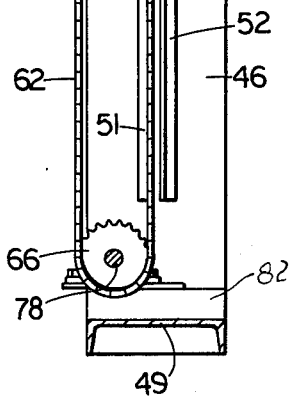
FIG. 6 is a fragmentary perspective view showing details of a corner construction of a damper sealing structure forming a part of the damper mount.
Figure 6:
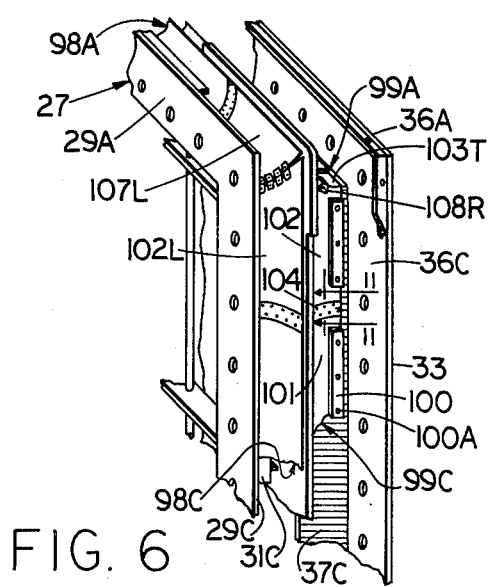
Figure 11:
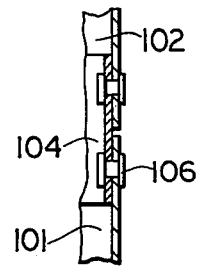
FIG. 11 is a view in section taken on an enlarged scale on the line 11—11 in FIG. 6.
Figure 12:
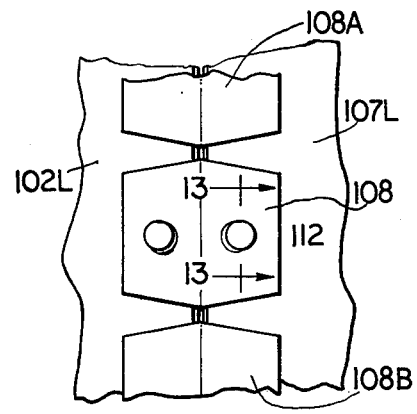
FIG. 12 is a fragmentary view in elevation showing end portions of two spring seal members of the damper mount.
Figure 13:
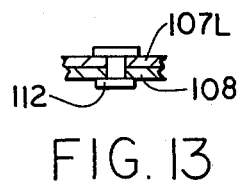
FIG. 13 is a view in section taken on the line 13—13 in FIG. 12.

Each of the spring seal members 98 to 98C and 99 to 99C includes a central section and two end sections in the manner that the spring seal member 99C (FIG. 10) includes a central section 101 and end sections 102 and 103. End edges of the central section 101 abut end edges of the end sections 102 and 103, and bridge plates 104, one of which is shown in FIG. 11, cover the adjoining edges. The bridge plate 104 is attached to the adjoining end portions of the central section 101 and the end section 102 by rivets 106. An outer end edge of the end section 102 (FIG. 6) substantially abuts an outer edge of an end section 103T of the spring seal member 99A. Similarly, an outer edge of an end section 102L of the spring seal member 98C substantially abuts an outer edge of an end section 107L of the spring seal member 98A as shown in FIGS. 6 and 12. As shown in FIG. 12, angle-shaped bridge members 108, 108A and 108B bridge a portion of the gap between the end section 107L and the end section 102L and hold adjacent edges thereof in closely spaced alignment.

Figure 14:
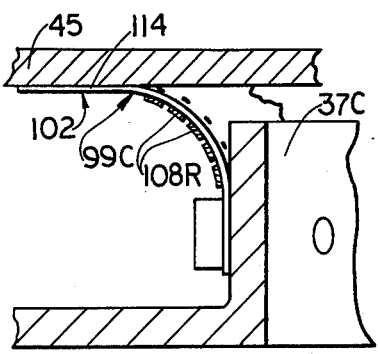
FIG. 14 is a view in section taken on an enlarged scale on the line 14—14 in FIG. 10.

The bridge member 108 is attached to the end sections 102L and 107L by rivets 112. As shown in FIGS. 6 and 14, bridge members 108R cover a portion of the gap between the end section 102 and the end section 103T (FIG. 10) of the spring seal member 99A. As shown in FIG. 14, a portion 114 of the edge of the end section 102, which engages the damper plate 45, is free of bridge members so that it can flex as the damper plate 45 moves in and out. Edges between other end sections are similarly bridged by bridge members (not shown) attached by rivets 112C (FIG. 10).

A first cover plate 131 (FIGS. 1 and 10) is removably attached to horizontal upper flanges of angle members 134 and 136 (FIG. 3) by fasteners 137. Upright side flanges of the angle members 134 and 136 are attached to the flanges 29A and 36A. An inlet conduit 142 communicates with an opening 143 (FIG. 10) in the cover plate 131. A blower 144 is mounted on the conduit 142 for blowing air through the opening 143. A second cover plate 145 is removably attached to first flanges of angle members 148 and 149 (FIG. 5), respectively, by fasteners 151. Second flanges of the angle members 148 and 149 are attached to the flanges 29B and 36B. A third cover plate 156 is removably attached to first flanges of angle members 159 and 161, respectively by fasteners 162. Second flanges of the angle members 159 and 161 are attached to the flanges 29B and 36B. A fourth cover plate 163 (FIG. 3) spans the flange 29 and the cross frame 86. A fifth cover plate 164 spans the flange 36 and the cross frame 87.

The cover plates 131, 145, 156, 163 and 164, the spring seal members 91, 92, 98–98C and 99—99C, the annular members 27 and 33, the cross frames 86 and 87, and upper portions of the channel frames 46 and 47 define an enclosed annular chamber 171 surrounding adjoining ends of the duct sections 21 and 22. When the damper plate 45 is in closed position, the damper plate 45 spans the chamber 171. The lower portion of the chamber 171 is divided into sections 171A and 171B by the damper plate 45. The pressure in the annular chamber 171 caused by the blower 144 can be greater than that in either the duct sections 21 and 22 so that any leakage around the damper plate 45 is into the duct sections 21 and 22, and contents of the duct sections do not escape.

The cover plates make possible access to the seal members for service and cleaning without disassembly of the seal members.

The damper plate 45 is guided by frame reinforcing bars 176, which span the flanges 31 and 31A (FIG. 3), and frame reinforcing bars 177, which span the flanges 37 and 37A. Transverse reinforcing rods 178 span the flanges 31B and 31C (FIG. 5). Transverse reinforcing rods 179 span the flanges 37B and 37C.

The damper sealing structure described above and illustrated in the drawings is subject to structural modification without departing from the spirit and scope of the appended claims.

Having described my invention, what I claim as new and desire to secure by Letters Patent is:

1. In combination, a pair of aligned duct sections, an assembly of bent plate spring duct seal members forming a seal assembly mounted on each duct section at adjacent ends thereof, a damper plate advanceable between the seal assemblies in sealing relation therewith between a closed position in which the damper plate spans the seal assemblies and an open position, each of the seal assemblies including a plurality of bent plate seal spring members with end portions of the spring seal members adjoining, one lengthwise edge portion of each spring seal member being mounted on the associated duct section, angle-shaped bridge members bridging sections of the adjoining edges adjacent said lengthwise edge portion of each spring seal member, sections of the adjacent edges remote from said lengthwise edge portion being free to flex as the damper plate is advanced and retracted, an enclosure surrounding the seal assemblies to form a chamber surrounding the seal assemblies, and means for blowing into the chamber to prevent escape of contents of the duct sections at the damper plate.

2. A combination as in claim 1 wherein each bridge member is attached to adjoining spring seal members adjacent to the adjoining edges thereof.

* * * * *